US012358755B2

(12) United States Patent
Chen et al.

(10) Patent No.: US 12,358,755 B2
(45) Date of Patent: Jul. 15, 2025

(54) FRUSTUM-DESIGNED RADAR REFLECTOR FOR ELEVATOR

(71) Applicant: HONEYWELL INTERNATIONAL INC., Charlotte, NC (US)

(72) Inventors: En Yi Chen, Charlotte, NC (US); Yang Lu, Charlotte, NC (US); Ming Zhou Yan, Charlotte, NC (US)

(73) Assignee: Honeywell International Inc., Charlotte, NC (US)

(*) Notice: Subject to any disclaimer, the term of this patent is extended or adjusted under 35 U.S.C. 154(b) by 325 days.

(21) Appl. No.: 18/049,023

(22) Filed: Oct. 24, 2022

(65) Prior Publication Data
US 2023/0137593 A1 May 4, 2023

(30) Foreign Application Priority Data
Oct. 29, 2021 (CN) .......................... 202111272942.1

(51) Int. Cl.
B66B 1/34 (2006.01)
G01S 7/02 (2006.01)
G02B 5/09 (2006.01)

(52) U.S. Cl.
CPC ............ B66B 1/3492 (2013.01); G01S 7/027 (2021.05); G02B 5/09 (2013.01)

(58) Field of Classification Search
CPC ..... B66B 1/3492; B66B 1/3423; G01S 7/027; G01S 13/88; G01S 13/756; G01S 13/913;
(Continued)

(56) References Cited

U.S. PATENT DOCUMENTS 2,438,987 A * 4/1948 Bailey .................. G01S 13/913
342/51
2,461,005 A * 2/1949 Southworth ........... H01Q 21/29
331/106
(Continued)

FOREIGN PATENT DOCUMENTS

CN 105301681 A 2/2016
CN 105929472 A 9/2016
(Continued)

Primary Examiner — Bernarr E Gregory
(74) Attorney, Agent, or Firm — Alston & Bird LLP

(57) ABSTRACT

Various embodiments are directed to a radar reflector configured for radar-based distance measurements for determining a position of an elevator car within an elevator shaft. The radar reflector comprises three or more triangular panels defining a pyramidal frustum volume having a base plane and an upper plane that are parallel. The pyramidal frustum volume is configured to directly reflect radar signals originating from a radar transceiver back to the radar transceiver based at least in part on the triangular panels being mutually perpendicular at a projected apex above the upper plane. The reflected radar signals reflected by the radar reflector have substantially parallel trajectories with the original, pre-reflected radar signals emitted by the radar transceiver. The triangular panels of the radar reflector being mutually perpendicular advantageously maintains direct reflection of radar signals in spite of any potential horizontal tilt of the radar reflector to a certain extent.

12 Claims, 9 Drawing Sheets

(58) Field of Classification Search
CPC ........ G02B 5/09; G01F 23/284; H01Q 13/02; H01Q 15/0086; H01Q 21/245; H01Q 15/18; H01Q 13/0291; H01Q 15/14; H01Q 1/42; H01Q 21/29
USPC ................................. 342/5–12; 343/907–916
See application file for complete search history.

(56) References Cited

U.S. PATENT DOCUMENTS

| | | | | |
|---|---|---|---|---|
| 2,520,008 | A * | 8/1950 | King | H01Q 15/18 342/6 |
| 2,577,463 | A * | 12/1951 | Hansell | H01Q 1/42 343/785 |
| 2,581,352 | A * | 1/1952 | Bliss | H01Q 21/245 343/912 |
| 2,908,002 | A * | 10/1959 | Van Atta | H01Q 15/14 343/705 |
| 3,308,464 | A * | 3/1967 | Lewis | G01S 13/756 342/6 |
| 3,611,396 | A * | 10/1971 | Jones, Jr. | H01Q 13/0291 343/786 |
| 4,375,057 | A * | 2/1983 | Weise | B66B 1/3492 33/700 |
| 4,733,236 | A * | 3/1988 | Matosian | H01Q 15/18 342/52 |
| 5,258,768 | A * | 11/1993 | Smith | H01Q 21/245 343/756 |
| 10,840,601 | B2 * | 11/2020 | Ochiai | H01Q 13/02 |
| 2003/0057030 | A1 * | 3/2003 | Yumura | B66B 1/3423 187/394 |
| 2012/0176287 | A1 * | 7/2012 | Martin | H01Q 15/0086 343/786 |
| 2021/0055151 | A1 * | 2/2021 | Yenna | G01F 23/284 |

FOREIGN PATENT DOCUMENTS

| | | |
|---|---|---|
| CN | 110389399 A | 10/2019 |
| JP | 2005-098897 A | 4/2005 |
| JP | 2006-013819 A | 1/2006 |
| KR | 10-2109342 B1 | 5/2020 |

* cited by examiner

FRUSTUM-DESIGNED RADAR REFLECTOR FOR ELEVATOR

CROSS-REFERENCE TO RELATED APPLICATIONS

This application claims priority pursuant to 35 U.S.C. 119(a) to Chinese Application No. 202111272942.1, filed Oct. 29, 2021, which application is incorporated herein by reference in its entirety.

FIELD OF THE INVENTION

Various embodiments described herein relate generally to measurement systems used in conjunction with an elevator system. More particularly, various embodiments of the present disclosure relate to radar-based elevator positioning systems involving radar signal measurements for precise determination of a position of an elevator car within an elevator shaft.

BACKGROUND

Industrial and commercial applications may use elevator systems to facilitate the transport of people, cargo, and/or the like throughout various levels of a multi-story building. In particular, an elevator positioning system may be used to monitor the real-time position (e.g., the height) of an elevator car within an elevator shaft, such that the elevator car may move between one or more desired positions along the elevator shaft. Real-time positioning is vital for further control of the elevator car, including stop positing, unexpected car movement protection, overspeed detection, and brake permeance monitoring.

BRIEF SUMMARY

Various embodiments described herein provide a radar reflector including three or more triangular panels defining a pyramidal frustum volume having a base plane and an upper plane that are parallel. The pyramidal frustum volume is configured to directly reflect radar signals originating from a radar transceiver back to the radar transceiver based at least in part on the triangular panels being approximately mutually perpendicular at a projected apex above the upper plane. Base plane geometry of the pyramidal frustum volume is based at least in part on the number of triangular panels included by the radar reflector (e.g., triangular base plane for three-panel radar reflector, rectangular base plane for four-panel radar reflector).

In various embodiments, the three or more triangular panels each include an upper vertex portion that interfaces with other upper vertex portions of the other triangular panels to form the upper plane of the pyramidal frustum volume. In various embodiments, each triangular side panel includes lateral edges having protruding joint features, and the three or more triangular panels are connected to each other via the protruding joint features. In various embodiments, each triangular panel is configured with an upper vertex angle determined based at least in part on a total number of triangular side panels for the radar reflector. In various embodiments, the base plane of the pyramidal frustum volume is defined in a particular geometric shape configured to cause the radar signals reflected by the pyramidal frustum volume to have a particular signature associated with the particular geometric shape. For example, the particular geometric shape is radially asymmetrical. In various embodiments, each pair of the triangular panels forms an angle at the projected apex of between approximately 80 degrees and approximately 100 degrees.

In various embodiments, the three or more triangular panels are manufactured from a common material panel. In various embodiments, the radar reflector and the radar transceiver are configured for determining radar-based distance measurements for an elevator positioning system configured to determine a position of an elevator car within an elevator shaft. In various embodiments, the radar reflector is configured to interface with an attachment feature of the elevator shaft or an attachment feature of the elevator car via the upper plane of the pyramidal frustum volume.

Various embodiments of the present disclosure provide a radar reflector array including a plurality of radar reflectors connected in a planar arrangement. Each radar reflector includes three or more triangular panels defining a pyramidal frustum volume having a base plane and an upper plane that are parallel. The pyramidal frustum volume of each radar reflector is configured to directly reflect radar signals originating from a radar transceiver back to the radar transceiver based at least in part on the triangular panels being approximately mutually perpendicular at a projected apex above the upper plane. A first ratio between a total area spanned by the base planes of the plurality of radar reflectors and a height of the radar reflector array is significantly greater than a second ratio between an area spanned by one base plane of one radar reflector and a height of the one radar reflector.

In various embodiments, the three or more triangular panels of a radar reflector each include an upper vertex portion that interfaces with other upper vertex portions to form the upper plane of the pyramidal frustum volume of the radar reflector. In various embodiments, each triangular side panel of a radar reflector of the radar reflector array includes lateral edges having protruding joint features, and the three or more triangular panels are connected to each other via the protruding joint features. In various embodiments, each triangular panel of a radar reflector of the radar reflector array is configured with an upper vertex angle determined based at least in part on a total number of triangular side panels for the radar reflector of the radar reflector array. In various embodiments, the base plane of the pyramidal frustum volume of a particular radar reflector of the radar reflector array is defined in a particular geometric shape configured to cause the radar signals reflected by at least the particular radar reflector of the radar reflector array to have a particular signature associated with the particular geometric shape. For example, the particular geometric shape is radially asymmetrical. In various embodiments, each pair of the triangular panels of a radar reflector of the radar reflector array forms an angle at the projected apex of between approximately 80 degrees and approximately 100 degrees.

In various embodiments, the three or more triangular panels of at least one radar reflector are manufactured from a common material panel. In various embodiments, the radar reflector array and the radar transceiver are configured for determining radar-based measurements for an elevator positioning system configured to determine a position of an elevator car within an elevator shaft. In various embodiments, the radar reflector array is configured to interface with an attachment feature of the elevator shaft or an attachment feature of the elevator car via each upper plane of the plurality of radar reflectors.

Various embodiments of the present disclosure provide a radar reflector for determining a position of an elevator car within an elevator shaft using radar-based distance measurements. The radar reflector includes three or more triangular panels defining a pyramidal volume having a base plane and an apex. The triangular panels being approximately mutually perpendicular at the apex of the pyramidal volume. With the triangular panels being approximately mutually perpendicular at the apex, the pyramidal volume is configured to directly reflect radar signals originating from a radar transceiver back to the radar transceiver.

In various embodiments, each triangular side panel includes lateral edges having protruding joint features, and the three or more triangular panels are connected to each other via the protruding joint features. In various embodiments, each triangular panel is configured with an upper vertex angle determined based at least in part on a total number of triangular side panels for the radar reflector. In various embodiments, the base plane of the pyramidal frustum volume is defined in a particular geometric shape configured to cause the radar signals reflected by the pyramidal frustum volume to have a particular signature associated with the particular geometric shape. For example, the particular geometric shape is radially asymmetrical. In various embodiments, each pair of the triangular panels forms an angle at the projected apex of between approximately 80 degrees and approximately 100 degrees.

In various embodiments, the three or more triangular panels are manufactured from a common material panel. In various embodiments, the radar reflector and the radar transceiver are configured for determining radar-based distance measurements for an elevator positioning system configured to determine a position of an elevator car within an elevator shaft. In various embodiments, the radar reflector is configured to interface with an attachment feature of the elevator shaft or an attachment feature of the elevator car via an exterior-facing surface of at least one of the three or more triangular panels.

Various embodiments of the present disclosure provide a radar reflector array for determining a position of an elevator car within an elevator shaft using radar-based distance measurements. The radar reflector array includes a plurality of radar reflectors connected in a planar arrangement. Each radar reflector includes three or more triangular panels defining a pyramidal volume having a base plane and an apex. The pyramidal volume is configured to directly reflect radar signals originating from a radar transceiver back to the radar transceiver based at least in part on the triangular panels being approximately mutually perpendicular at the apex of the pyramidal volume. A first ratio between a total area spanned by the base planes of the plurality of radar reflectors and a height of the radar reflector array is significantly greater than a second ratio between an area spanned by one base plane of one radar reflector and a height of the one radar reflector.

BRIEF DESCRIPTION OF THE DRAWINGS

Reference will now be made to the accompanying drawings, which are not necessarily drawn to scale, and wherein.

DETAILED DESCRIPTION

Figure 1:
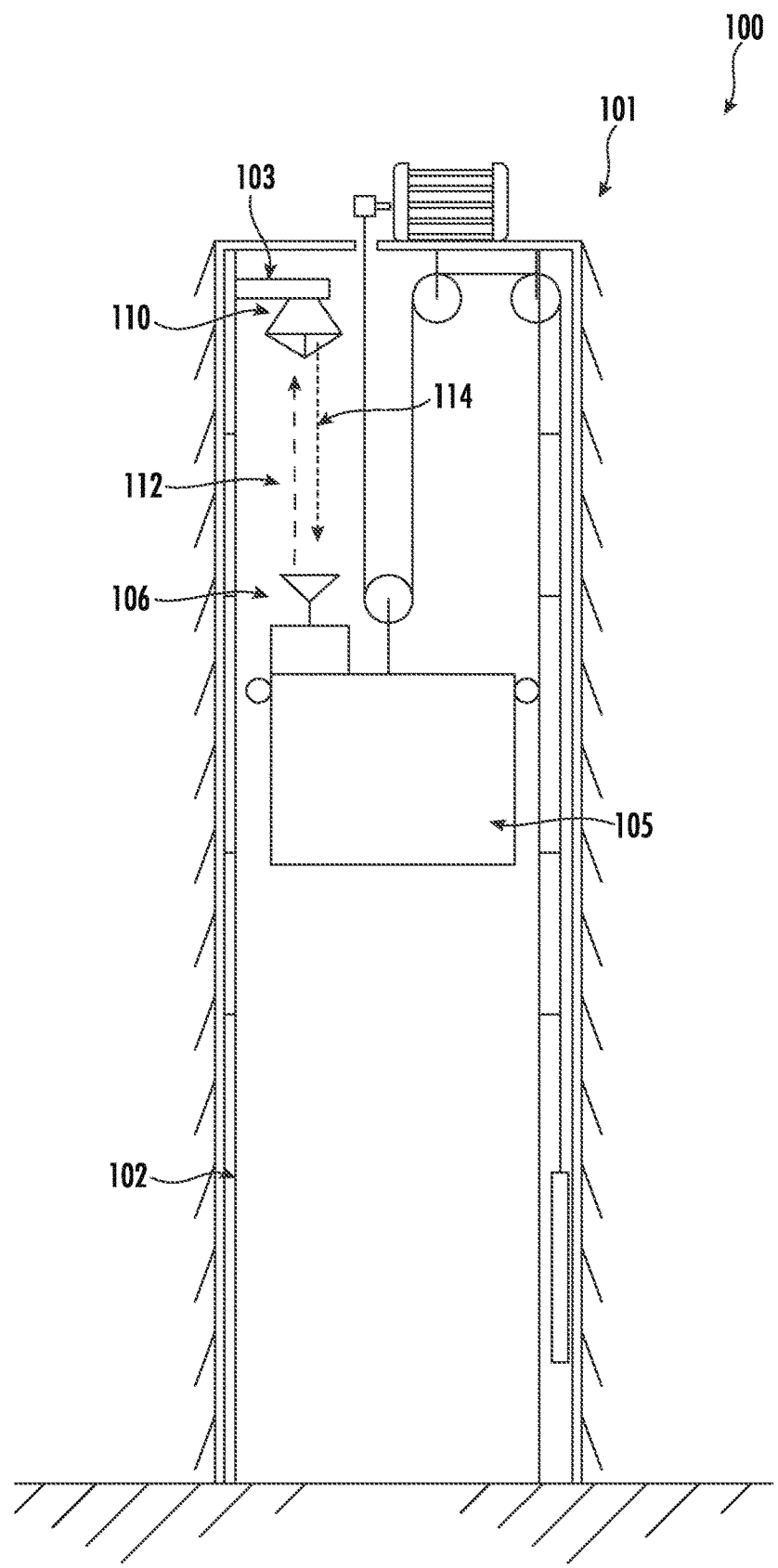
FIG. 1 schematically illustrates an exemplary system for determining a position of an elevator car within an elevator shaft, in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Elevator positioning systems may use radar-based distance measurements for accurate and precise determinations of a position of an elevator car within an elevator shaft. As understood by those of skill in the field to which the present disclosure pertains, radar-based distance measurement may rely on emitting radar signals, and detecting and measuring reflections of the radar signals from a radar reflecting surface. However, imperfections in the positioning and installation of radar reflecting surfaces (e.g., reflector plates, reflector slabs) may cause the reflections of the radar signals, or reflected radar signals, to be mis-directed away from a radar transceiver configured to detect the radar signal reflections, or at least cause the reflections of radar signals to be detected with low and inadequate signal strength due to non-normal or non-perpendicular incidence angle of the reflected radar signals at the radar transceiver. In particular, horizontal tilt of radar reflecting surfaces even to the extent of one degree may cause attenuation of detected signal strength of reflected radar signals of between approximately −60 dBm (decibel relative to one milliwatt) to −180 dBm. This attenuating effect is exacerbated as elevator shafts may extend for long distances and elevations. As such, existing reflecting plates and reflecting slabs are required to be installed with minimal horizontal tilt angles, which is difficult at installation even with laser leveling tools and devices. Further, material deformation over time, due to heat and stress for example, may cause a horizontal tilt angle of such existing reflecting plates and reflecting slabs to reach unacceptable values, therefore requiring routine horizontal calibration.

Various embodiments described herein relate to a radar reflector configured for use in an elevator positioning system, the radar reflector configured to directly reflect radar signals to a radar transceiver for reliable radar-based measurement with improved signal strength. Direct reflection of radar signals by the radar reflector may be understood by reflected radar signals having approximately parallel trajectories with original, pre-reflection radar signals, such that the reflected radar signals are approximately directed towards the radar transceiver for detection with an approximately normal or perpendicular incidence angle. For instance, in various embodiments, the reflected radar signals have a trajectory different from the trajectory of the original (e.g., pre-reflected) radar signals by less than 5 degrees. In some embodiments, the difference in trajectories of the reflected radar signals and the original radar signals is less than 3 degrees. In some embodiments, the difference in trajectories of the reflected radar signals and the original radar signals is less than 1 degree. In some embodiments, the difference in trajectories of the reflected radar signals and the original radar signals is preferably less than 0.3 degrees. Thus, various embodiments provide a radar reflector configured for direct or parallel reflection of radar signals to enable improved detection of reflected radar signals through improving detected signal strength of the reflected radar signals at the radar transceiver. Use of radar reflectors in accordance with various embodiments described herein therefore improve upon the use of radar-based elevator positioning systems through improvement of the reflection of radar signals for distance determinations.

That is, such direct reflection of radar signals back to the radar reflector improves upon radar-based distance measurements in elevator positioning systems, in some examples. Various embodiments provide a radar reflector that is configured to directly reflect radar signals back to the radar transceiver, even when being tilted or angled to a certain extent, such that radar-based measurements can be used in elevator car positioning.

In various embodiments, the radar reflector includes three or more triangular panels to form a pyramidal frustum volume, and direct reflection of radar signals is enabled by the triangular panels being approximately mutually perpendicular. As the volume of the radar reflector is a frustum, the triangular panels do not physically meet at a pyramidal apex, in various embodiments; however, the triangular panels are approximately perpendicular (e.g., forming an angle preferably between 85 degrees and 95 degrees) at a projected (e.g., extended, hypothetical, extrapolated) apex. With the triangular panels being at least approximately mutually perpendicular, a radar signal impacting one panels is reflected towards at least one other panel, at which the radar signal is again reflected at a trajectory substantially parallel with its original trajectory. Thus, the reflected radar signals are directly oriented and travel towards the radar transceiver from which the original radar signals originate.

Due to the multi-panel reflection against approximately perpendicular panels, the radar reflector may have horizontal tilt angles to an extent (e.g., at least greater than 0.1 degrees) without causing reflected radar signals to have significantly attenuated signal strength at the radar transceiver. In some embodiments, a radar reflector in accordance with various embodiments described herein may have a horizontal tilt angle (e.g., due to imperfections and misalignment during installation, due to material expansion or deformation over time) of greater than approximately 0.5 degrees without significant signal strength loss of the reflected radar signals at the radar transceiver. In some example embodiments, the radar reflector may have a horizontal tilt angle of greater than approximately 1 degree and less than approximately 5 degrees without significant signal strength loss of the reflected radar signals at the radar transceiver. In some examples, the radar reflector is preferably maintained with a horizontal tilt angle of less than 2 degrees for optimal radar signal reflection. Thus, the radar reflector may have some horizontal tilt without causing the radar signals to be indirectly or mis-directly reflected to a significant extent.

As described, the triangular panels are approximately mutually perpendicular at a projected apex, and the projected apex is positioned above an upper plane of the radar reflector. That is, the pyramidal frustum volume of the radar reflector includes a base plane and an upper plane, and the triangular panels of the radar reflector converge towards the upper plane. In various embodiments, the upper plane of the radar reflector is formed by upper vertex portions of each of the triangular panels being folded, bent, and/or the like, and the upper plane is substantially parallel with the base plane. With the radar reflector having a pyramidal frustum volume with a base plane and an upper plane, an overall height of the radar reflector is optimized and minimized. Further, the radar reflector having an upper plane instead of a pyramidal apex enables improved interfacing and attachment of the radar reflector to the elevator shaft or the elevator car, for example.

FIG. 1 schematically illustrates an exemplary elevator positioning system 100 according to various embodiments described herein. The elevator positioning system 100 is configured for determining a position (e.g., a height) of an elevator car 105 within the elevator shaft 101. For example, an elevator positioning system 100 may be configured to determine the relative position (e.g., the relative height) of an elevator car within an elevator shaft as measured in a vertical direction (e.g., a direction extending parallel to a central axis of the elevator shaft along a height of the elevator shaft). In various embodiments, the elevator positioning system 100 is configured to determine the position of the elevator car 105 based at least in part on radar-based distance measurements, specifically measurements of a distance between a radar transceiver 106 and a radar reflector 110. Thus, in various embodiments, the radar transceiver 106 and the radar reflector 110 are arranged within the elevator shaft 101 such that the elevator positioning system 100 may determine a position of the elevator car 105 within the elevator shaft 101 at a particular instance.

Generally, the elevator shaft 101 may comprise an internal shaft portion configured to house an elevator car 105 such that a full range of motion of the elevator car 105 exists within the internal shaft portion of the elevator shaft. As illustrated, the internal shaft portion of the elevator shaft 101 may be defined within a plurality of outer walls of the elevator shaft 101, such as, for example, a top shaft surface, a bottom shaft surface, and one or more sidewalls extending in a substantially vertical direction between the top shaft surface and the bottom shaft surface. In various embodiments, the elevator shaft 101 comprises one or more rail fixtures 102 attached to one or more sidewalls, and the elevator car 105 is configured to travel in a guided movement along the rail fixtures 102. For example, the elevator car 105 comprises wheels configured to interface with the rail fixtures 102 for smooth and guided movement of the elevator car 105.

In various embodiments, a shaft height of the elevator shaft 101 may be defined by a distance between the top shaft surface and the bottom shaft surface, as measured in the vertical direction. For example, in various embodiments, one or more of the top shaft surface and the bottom shaft surface may be centered about the central axis of the elevator shaft 101 such that a perpendicular axis extending from a center of the respective surface may be coaxial with the central axis of the elevator shaft 101. Further, in various embodiments, one or more of the top shaft surface and the bottom shaft surface may comprise at least substantially planar surfaces extending along a horizontal plane. As a non-limiting example, each of the top shaft surface and the bottom shaft surface may extend along a respective horizontal plane such that the top shaft surface and the bottom shaft surface are parallel to one another. In such an exemplary configuration, the height of the elevator shaft may be defined by the distance along the central axis of the elevator shaft 101 between the top shaft surface and the bottom shaft surface. As previously discussed, the elevator positioning system 100 is configured to determine a relative height of the elevator car 105 within the elevator shaft 101; for example, the relative height of the elevator car 105 may reference and/or be a fraction of the height of the elevator shaft 101.

In various embodiments, an elevator car 105 disposed within an elevator shaft 101 may be configured in a substantially level configuration wherein a top car surface and a bottom car surface each comprise an at least substantially planar surface extending along respective horizontal planes, each plane being perpendicular to the vertical direction, as described herein. For example, the top car surface and the bottom car surface may be parallel to one another. Further, in various embodiments, the top car surface and the bottom car surface may be parallel to one or more of the top shaft surface and the bottom shaft surface. In various embodiments, the elevator car 105 is substantially level based at least in part on configuration and control of the wheels of the elevator car interfacing with the rail fixtures 102.

As illustrated, in various embodiments, the elevator car 105 may be configured such that the top car surface is arranged in an upward-facing configuration so as to face toward the top shaft surface of the elevator shaft 101 positioned vertically above the elevator car 105. Further, in various embodiments, the elevator car 105 may be configured such that bottom car surface is arranged in a downward-facing configuration so as to face toward the bottom shaft surface of the elevator shaft 101 positioned vertically beneath the elevator car 105. In various embodiments, an elevator car 105 may be installed within an elevator shaft 101 in an at least partially suspended configuration such that one or more gravitational forces acting on the elevator car 105 may stabilize the bottom car surface in an at least substantially horizontal configuration perpendicular to the vertical direction.

In various embodiments, the elevator car 105 may have a range of motion within the internal shaft portion of the elevator shaft 101 that may be defined in an at least substantially vertical direction by the rail fixtures 102. With controlled motion of the elevator car 105 (e.g., for delivery of people, cargo, and/or the like between different levels of a building), the position or height of the elevator car 105 within the elevator shaft may be variable over time, and the elevator positioning system 100 is configured to determine a position of the elevator car 105 at different timepoints and to record a time-dependent or time-variable profile of elevator car position.

As described herein, in various embodiments, the elevator positioning system 100 may comprise a radar transceiver 106 configured to emit a signal (e.g., a RF wave, a radar wave, and/or the like) and receive a reflection comprising at least a portion of the emitted signal reflected back from a radar reflector 110 of the elevator positioning system 100. That is, generally, the radar transceiver 106 is configured to transmit original radar signals 112 (e.g., pre-reflection, non-reflected, outbound) and to receive reflected radar signals 114. As a non-limiting example, in various embodiments, the radar transceiver 106 may comprise a single chip, Frequency Modulation Continuous Wave (FMCW) element be configured to emit a signal comprising a 60 GHz radar wave. In various embodiments, a radar transceiver 106 may be configured to receive reflected radar signals 114 and subsequently transmit transceiver signal data indicative of the detected reflection to a controller. As a non-limiting example, in various embodiments, the radar transceiver 106 may be configured to detect one or more signals present within an elevator shaft (e.g., reflected radar signals 114) using a dielectric lens antenna.

In various embodiments, a radar transceiver 106 is attached to a surface such that the radar transceiver 106 is disposed within the internal shaft portion of the elevator shaft 101 and arranged in an at least substantially vertical configuration (e.g., facing a vertically upward direction, facing a vertically downward direction). As discussed, the elevator positioning system 100 includes a radar reflector 110 configured to directly reflect radar signals back to the radar transceiver 106, and the radar reflector 110 is also disposed within the internal shaft portion of the elevator shaft. In particular, the radar reflector 110 and the radar transceiver 106 may be at least substantially vertically aligned. In some embodiments, the radar reflector 110 and the radar transceiver 106 are centered or aligned with respect to a vertical axis (e.g., a central axis of the elevator shaft 101, a sidewall of the elevator shaft 101, a rail fixture 102 parallel to a sidewall). As a result, radar signals travelling vertically within the internal shaft portion of the elevator shaft 101 and originating from the radar transceiver 106 may reach and impact at least a portion of the radar reflector 110.

Generally, one of the radar transceiver 106 or the radar reflector 110 is attached to a static surface, such as a surface of the elevator shaft 101, and the other one of the radar transceiver 106 or the radar reflector 110 is attached to the elevator car 105. As such, a distance between the radar transceiver 106 and the radar reflector 110 varies based at least in part on the position of the elevator car 105 within the elevator shaft 101. FIG. 1 illustrates a non-limiting example in which the radar transceiver 106 is fixedly secured to the top car surface of the elevator car 105 in a vertically upwards orientation, while the radar reflector is fixedly secured near the top shaft surface of the elevator shaft 101 in a vertically downwards orientation. In other non-limiting examples, the radar reflector 110 may be attached to the top car surface of the elevator car 105, while the radar transceiver 106 may be fixedly attached at or near the top shaft surface of the elevator shaft 101. In further non-limiting examples, the radar reflector 110 may be attached at a bottom shaft surface of the elevator shaft 101 in an upward-facing configuration, while the radar transceiver 106 may be fixedly attached to the bottom car surface of the elevator car 105 in a downward-facing configuration. In further yet non-limiting examples, the radar reflector 110 may be fixedly attached to a bottom car surface of the elevator car 105 in a downward-facing configuration, while the radar transceiver 106 may be fixedly attached to the bottom shaft surface of the elevator shaft 101 in an upward-facing configuration. Thus, FIG. 1 illustrates one of many configurations of an elevator positioning system 100 in which one of the radar transceiver 106 and the radar reflector 110 has a fixed relative position within the elevator shaft 101 and the other one of the radar transceiver 106 and the radar reflector 110 is attached to the elevator car 105, such that a distance between the radar transceiver 106 and the radar reflector 110 corresponds with the position of the elevator car 105.

As illustrated in FIG. 1, the radar reflector 110 may have a fixed relative position within the elevator shaft 101 in some configurations of the elevator positioning system 100, and the radar reflector 110 may be accordingly attached to the elevator shaft via a rail fixture 102. In various embodiments, the rail fixture 102 comprises an attachment feature 103 that interfaces with an upper plane of the radar reflector 110. As discussed, the radar reflector 110 is defined with a pyramidal frustum volume having a base plane and an upper plane, and the upper plane advantageously minimizes an overall height of the radar reflector 110 and provides an interfacing platform for attachment to the elevator shaft 101 (e.g., via the attachment feature 103) in some configurations, or the elevator car 105 (e.g., via a top car surface, via a bottom car surface) in other configurations.

Figure 2:
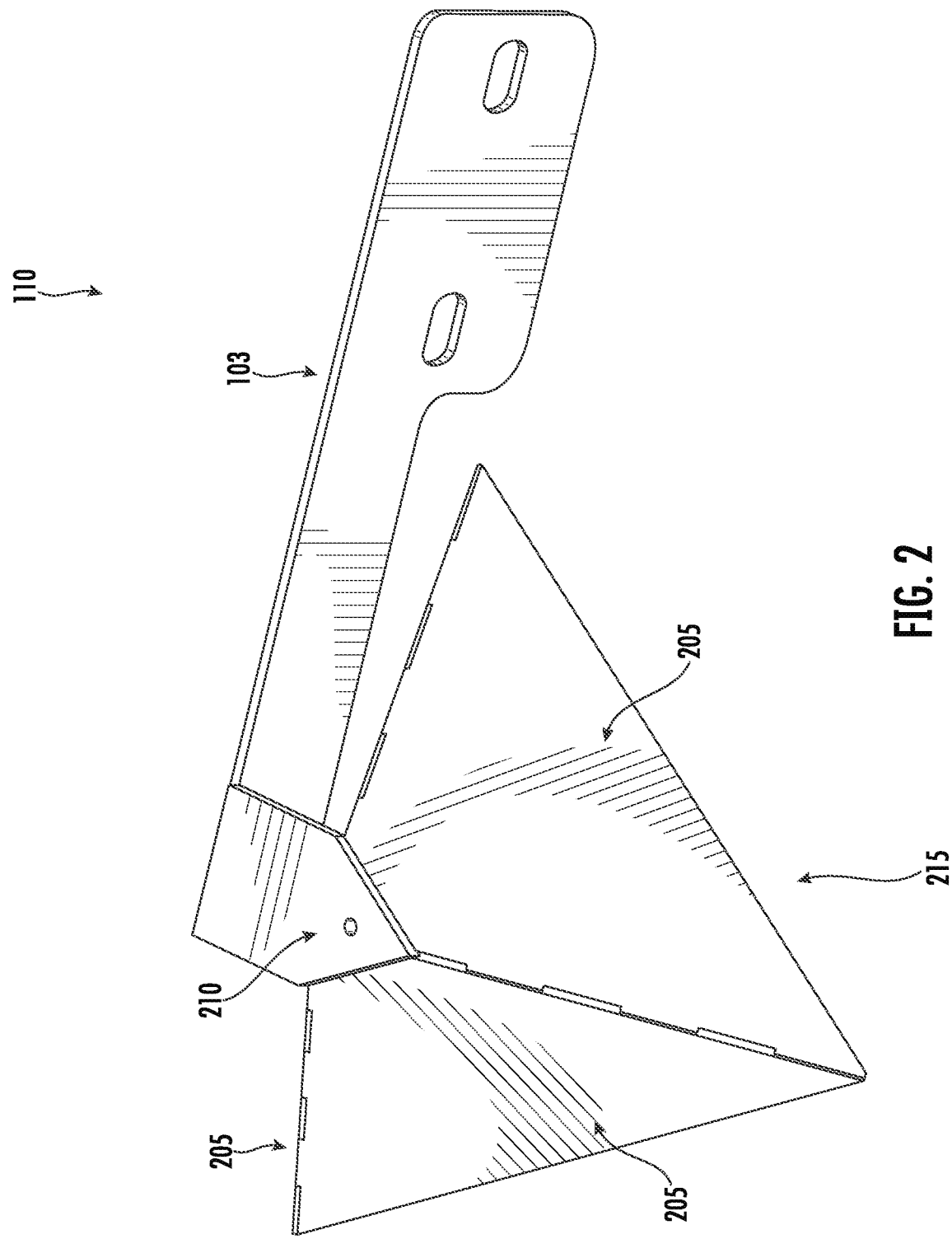
FIG. 2 illustrates a perspective view of an exemplary radar reflector, in accordance with various embodiments.

FIG. 2 illustrates a perspective view of an example radar reflector 110 and an attachment feature 103. In the illustrated embodiment, the attachment feature 103 is configured to be fixedly attached at one end to a rail fixture 102 of the elevator shaft 101, while interfacing at another end to an upper plane 210 of the radar reflector 110, such that the radar reflector 110 is fixed at a static position within the elevator shaft 101. As discussed, in other configurations, the upper plane 210 of the radar reflector 110 may directly interface with a top shaft surface of the elevator shaft 101 or a bottom shaft surface of the elevator shaft 101, such that the radar reflector 110 is fixed at a static position within the elevator shaft 101. In other non-limiting example configurations, the upper plane 210 of the radar reflector 110 directly interfaces with a top car surface of the elevator car 105 or a bottom car surface of the elevator car 105, such that a relative position of the radar reflector 110 within the elevator shaft 101 corresponds to the relative position of the elevator car 105 within the elevator shaft 101.

As illustrated in FIG. 2, the radar reflector 110 has a pyramidal frustum geometry and is comprised of three or more triangular panels 205. In various embodiments, each of the three or more triangular panels 205 are similarly dimensioned. For example, the triangular panels 205 are configured with the same height or length and the same base or width. In the illustrated embodiment, the radar reflector 110 is comprised of three triangular panels 205 such that the pyramidal frustum volume of the radar reflector 110 is based on a triangular pyramid. In other non-limiting examples, the radar reflector 110 is comprised of four triangular panels, thus having a rectangular pyramidal frustum volume. In some embodiments, the radar reflector 110 has an even number of triangular panels 205 greater than three such that each triangular panel 205 has a corresponding opposite panel.

Due to the frustum-based geometry of the radar reflector 110, the radar reflector 110 includes a base plane 215 that is at least substantially parallel with the upper plane 210. As the triangular panels 205 are angled and converge towards the upper plane 210 in a pyramidal fashion, the base plane 215 of the radar reflector 110 may span a greater area than the upper plane 210, and the geometry of the base plane 215 of the radar reflector 110 depends at least in part on the number of triangular panels 205. In the illustrated embodiment, for example, the base plane 215 is triangular due at least in part on the radar reflector 110 comprising three triangular panels 205.

Figure 3:
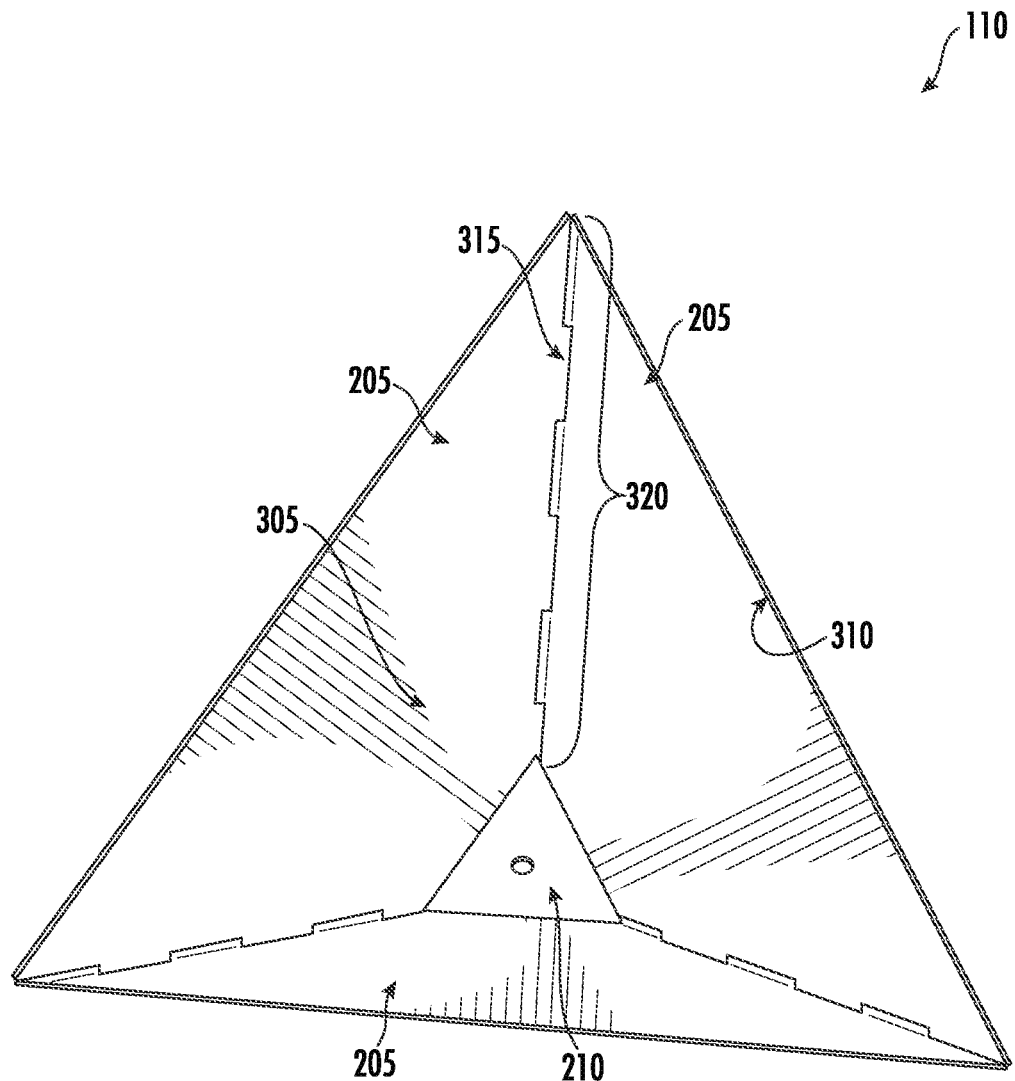
FIG. 3 illustrates a perspective view of an internal volume of an exemplary radar reflector in accordance with various embodiments.

In various embodiments, the radar reflector 110 is configured and oriented such that original radar signals 112 enter an interior volume of the radar reflector 110 through the base plane 215 of the radar reflector 110 and are reflected by interior-facing surfaces of the triangular panels 205. FIG. 3 illustrates a perspective view into the interior volume 305 of a radar reflector 110. As shown, the base plane 215 of the radar reflector 110 is defined by bottom edges 310 of each triangular panel 205, and in the illustrated embodiment, the base plane 215 is triangular. In various embodiments, the base plane 215 is only circumferentially defined such that the interior volume 305 of the radar reflector 110 is openly accessible. That is, the base plane 215 is not spanned by a panel or some material that would obstruct radar signals from traversing into the interior volume 305 of the radar reflector 110. As referred to within the context of the present disclosure, orientation of the radar reflector 110 may refer to accessibility of the interior volume of the radar reflector 110 through the base plane 215. In the illustrated embodiment of FIG. 2 for example, the radar reflector 110 may be in a downward-facing orientation as the base plane 215 is positioned below the upper plane 210 and the interior volume of the radar reflector 110 is accessible through the base plane 215 from below the radar reflector 110.

FIG. 3 further illustrates configuration of the triangular panels 205 to form the pyramidal frustum volume of the radar reflector 110. In various embodiments, each of the triangular panels 205 comprise joint features 315 for connection to other triangular panels 205. Specifically, the joint features 315 are positioned on at least one lateral edge 320 of each triangular panel 205, and the triangular panels 205 are connected at their lateral edges 320 via the joint features 315 to form the pyramidal frustum volume. In various embodiments, the joint features 315 may comprise a bent or folded tab that planarly interfaces with a surface or a joint feature 315 of another triangular panel 205. In various other embodiments, the joint features 315 may comprise hinges having channels that align with channels present in another triangular panel 205 and a dowel, rod, screw, nail, and/or the like for securing the alignment of said channels.

In various embodiments, the joint features 315 are configured to enable configuration of an angle between two triangular panels 205 along their lateral edges 320 that are connected via the joint features 315. That is, the joint features 315 may have a rotation mechanism (e.g., via hinging) enabling precise configuration of an angle between two triangular panels 205 along their lateral edges 320, such as during construction and installation of the radar reflector 110. Similarly, the joint features 315 may be configured to maintain an established or configured angle between two triangular panels 205 along their lateral edges after construction and installation and during use of the radar reflector 110. In the illustrated embodiment of FIG. 3, the three triangular panels 205 are approximately mutually perpendicular (e.g., preferably forming an angle between 80 degrees and 100 degrees) along their lateral edges 320, such that the pyramidal frustum volume is similar to a perpendicular corner of three surfaces. Thus, each joint feature 315 between two of the three triangular panels 205 may be configured to enable configuration of a 90 degree angle between the two triangular panels 205 (e.g., during construction, during installation, during calibration) and to maintain the 90 degree angle within a certain degree of freedom or tolerance.

Figure 4:
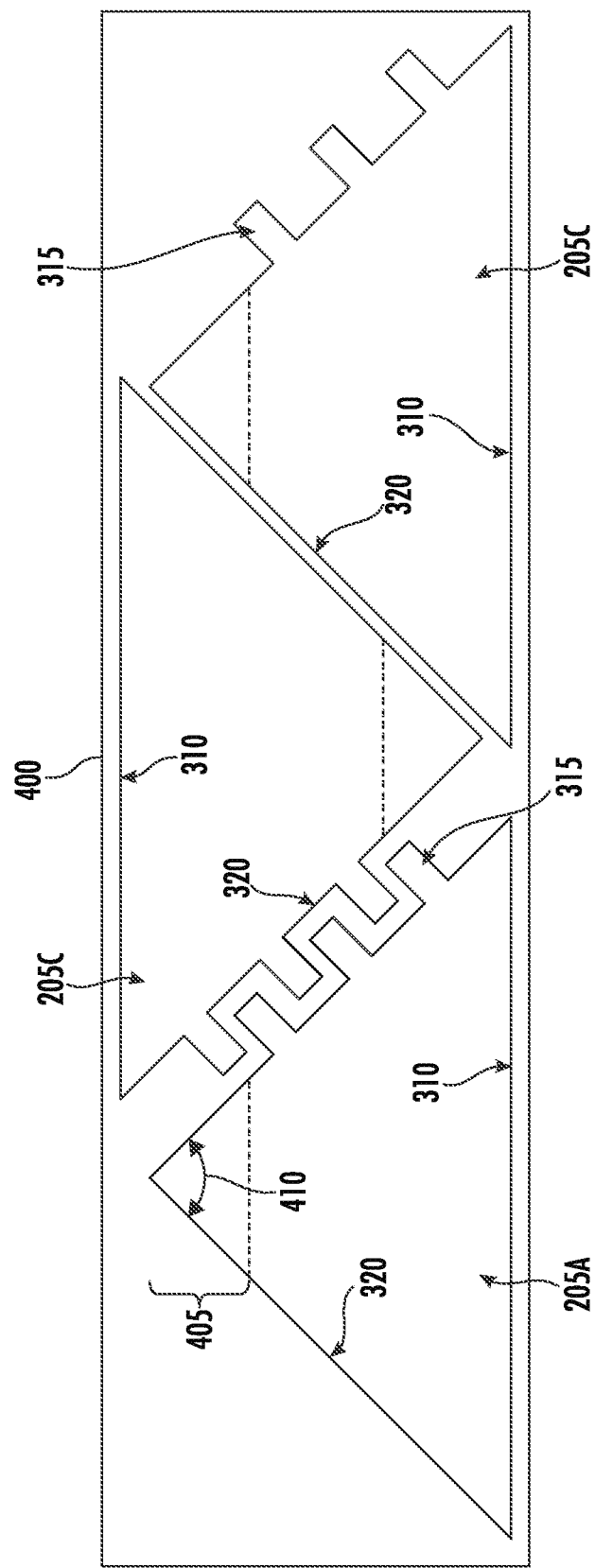
FIG. 4 illustrates an example schematic for manufacturing an exemplary radar reflector in accordance with various embodiments.

Referring now to FIG. 4, a schematic outline of triangular panels 205 is provided. As illustrated, each triangular panel 205 includes two lateral edges 320 that are configured to connect with lateral edges 320 of other triangular panels 205 to form a pyramidal frustum volume of the radar reflector 110. As discussed, one or both of the lateral edges 320 of a triangular panel 205 may include joint features 315 (e.g., tabs to be bent or folded to planarly interface with a surface or a joint feature 315 of another triangular panel 205) to enable or aid connection between triangular panels 205.

Each triangular panel 205 additionally includes a bottom edge 310. When the three or more triangular panels 205 are connected via their lateral edges 320, the bottom edges 310 of the three or more triangular panels 205 define and outline the base plane 215 of the radar reflector 110. As such, the geometry of the base plane 215, or the number of edges defining the base plane 215, depends upon the total number of triangular panels 205 of the radar reflector 110.

Each triangular panel 205 may be at least substantially isosceles; that is, each lateral edge 320 of a triangular panel 205 may be approximately the same length. In various embodiments, the length of the lateral edges 320 of the triangular panels 205 is approximately 1 meter. In some example embodiments, the length of the lateral edges 320 is between approximately 0.1 meters and approximately 1 meter. In some example embodiments, the length of the lateral edges 320 is between approximately 0.5 meters and approximately 1 meter. In some example embodiments, the length of the lateral edges 320 is between approximately 0.25 meters and approximately 0.75 meters. In some example embodiments, the length of the lateral edges 320 is one of approximately 0.1 meters, approximately 0.2 meters, approximately 0.3 meters, approximately 0.4 meters, approximately 0.5 meters, approximately 0.6 meters, approximately 0.7 meters, approximately 0.8 meters, approximately 0.9 meters, or approximately 1 meter.

Each triangular panel 205 then may be at least substantially vertically symmetric. A triangular panel 205 comprises an upper vertex portion 405 located at and including the upper vertex of the triangular panel, the upper vertex formed by the intersection of the two lateral edges 320 of the triangular panel 205. In various embodiments, the vertex angle 410 spanned by the upper vertex of each triangular panel 205 (e.g., between the lateral edges 320 of the triangular panel 205) is based at least in part on the number of triangular panels 205 of the radar reflector 110. For example, a radar reflector 110 having a large number of triangular panels 205 may require the upper vertex of each triangular panel 205 to span a smaller upper vertex angle 410.

In various embodiments, the upper vertex portions 405 for the three or more triangular panels 205 are configured to form the upper plane 210 of the radar reflector 110. An upper vertex portion 405 of a triangular panel 205 may be defined as a portion of the triangular panel 205 including the upper vertex and spanning across the triangular panel 205 to a line that is at least substantially parallel with the bottom edge 310 (e.g., the dotted line in FIG. 4). The line to which the upper vertex portion 405 spans may be configured at a height within the triangular panel 205 in order to configure the overall height of the radar reflector 110. For example, the line being near the upper vertex of a triangular panel 205 and thereby causing the upper vertex portion 405 to span a small area may result in the radar reflector 110 having a larger overall height.

In various embodiments, the line defining the upper vertex portion 405 may be between points that are approximately 0.05 meters to approximately 0.1 meters along the lateral edges 320 from the upper vertex. That is, the upper vertex portion 405 may be an approximately 0.05 meter to an approximately 0.1 meter corner of a triangular panel 205. In some example embodiments, the upper vertex portion 405 spans approximately one-tenth of the lateral edges of one triangular panel 205 (e.g., an approximately 0.1 meter corner of a triangular panel 205 with 1 meter lateral edges). In some example embodiments, the upper vertex portion 405 spans approximately one-fourth of the lateral edges of one triangular panel 205. In some example embodiments, the upper vertex portion 405 spans between approximately one-twentieth to approximately one-fourth of the lateral edges of one triangular panel 205. For example, for a triangular panel 205 having approximately one meter lateral edges 320, the upper vertex portion 405 is defined by a line spanning between points on the lateral edges 320 that are between approximately 0.05 meters to 0.25 meters along the lateral edges 320.

Configuration of the upper vertex portions 405 to form the upper plane 210 of the radar reflector 110 may involve causing an upper vertex portion 405 to be at an angle relative to the remainder of the triangular panel 205 (e.g., along the line bounding the upper vertex portion 405). For example, the upper vertex portions 405 of the triangular panels 205 may be bent down, folded down, hinged at an angle, and/or the like. As a result of the upper vertex portions 405 being bent at an angle with their respective triangular panel 205, the upper vertex portions 405 are planarly parallel when the three triangular panels 205 are connected at their lateral edges 320. Further, the upper vertex portions 405 may at least substantially overlap when the three triangular panels 205 are connected approximately perpendicularly at their lateral edges 320 such that the upper vertex portions 405 may planarly interface and may be secured. Returning briefly to FIG. 2, for example, the illustrated upper plane 210 is formed based at least in part on upper vertex portions 405 of each of the triangular panels 205 being at least substantially planarly parallel and interfacing. In various embodiments, the area spanned by the upper plane 210 is between approximately 0.05 meters squared and approximately 0.15 meters squared. In some example embodiments, the area spanned by the upper plane 210 is approximately 0.1 meters squared. In some example embodiments, the area spanned by the upper plane is approximately 0.1 meters squared to approximately 0.2 meters squared.

In various embodiments, the upper plane 210 formed by the upper vertex portions 405 includes a hole for interfacing with the attachment feature 103 of the elevator shaft 101 or with a surface of the elevator car 105. For example, the upper plane 210 includes a screw hole configured to align with a screw hole of the attachment feature 103 or a screw hold of a surface of the elevator car 105. As such, the radar reflector 110 is configured to be attached and secured to the elevator shaft 101 or the elevator car 105 via the upper plane 210.

In some embodiments, one or more of the upper vertex portions 405 may instead be removed from the triangular panels 205, thus forming one or more trapezoidal panels from the triangular panels 205. The trapezoidal panels are again connected via their lateral edges 320 to form the pyramidal frustum volume of the radar reflector 110. Due to the removal of the upper vertex portions 405 then, the upper plane 210 may only be circumferentially defined, similar to the base plane 215. In some embodiments, an upper panel may be laid across the upper edges of the trapezoidal panels to substantively form the upper plane 210.

FIG. 4 further illustrates triangular panels 205 of a radar reflector 110 being efficiently and compactly manufactured. As illustrated, the design and dimensions of the triangular panels 205 can be compactly arranged within a minimized rectangular plane. In various embodiments, the minimized rectangular plane may represent a common material panel 400 from which the triangular panels 205 are formed. A total area required of the common material panel 400 to manufacture multiple triangular panels 205 is then optimized and reduced due to compact arrangement of the multiple triangular panels 205. Each triangular panel 205 can then be cut or forged from the common material panel 400 without substantial waste of are of the common material panel 400 (e.g., using a metal cutting laser).

In various embodiments, the triangular panels 205 are formed from a metal material configured to reflect radar signals and/or any other radar-reflective material, and as such, the common material panel 400 may be comprised uniformly of metal material on at least one surface. In various embodiments, at least one surface of the common material panel 400 may be coated in radar-reflective material, such as radar-reflective paint, to increase reflectiveness of radar signals.

As previously discussed, a radar reflector 110 may include more than three triangular panels 205. Generally, a radar reflector 110 including more than three triangular panels 205 has an even number of triangular panels 205 such that each triangular panel 205 has an opposite and corresponding triangular panel 205. Thus, a radar reflector 110 may have a number of triangular panel pairs, in various embodiments.

Figure 5A:
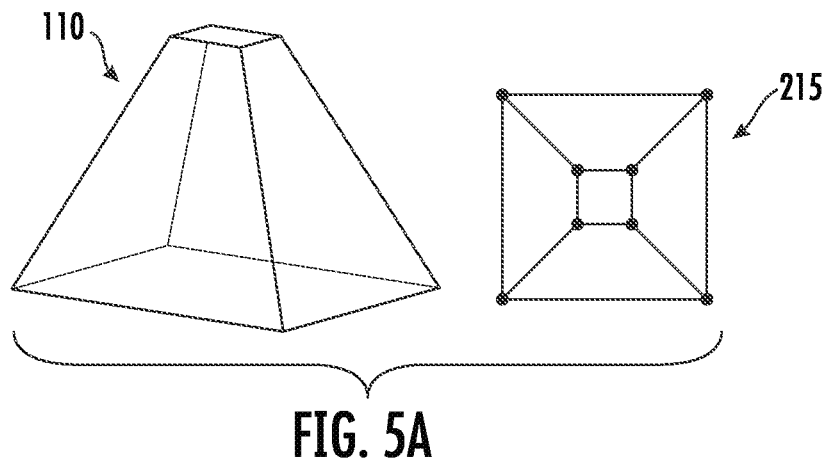
FIGS. 5A-C illustrate various exemplary radar reflectors in accordance with various embodiments of the present disclosure.
Figure 5B:
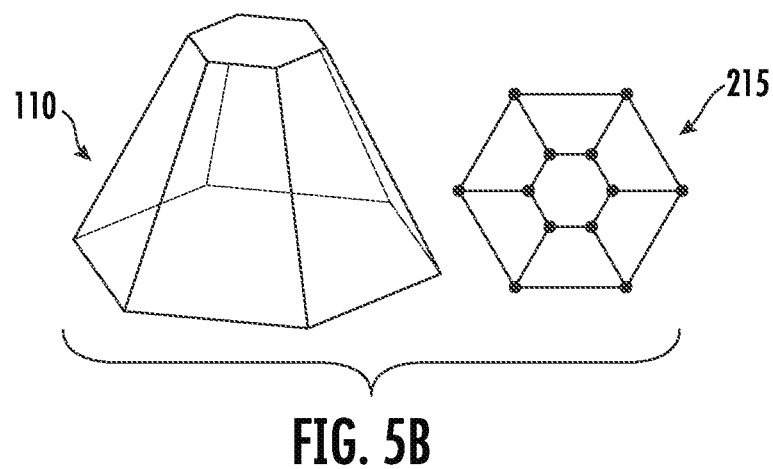
Figure 5C:
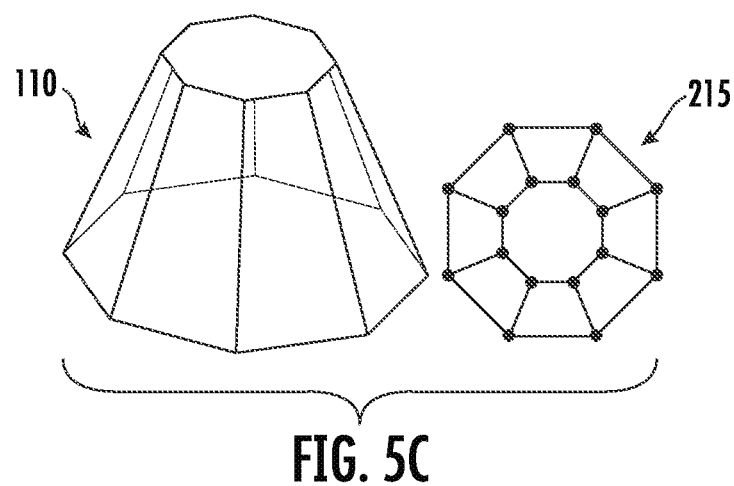

FIGS. 5A-C illustrate example radar reflectors 110 having more than three triangular panels 205. In various embodiments, the total number of triangular panels 205 affects the geometry of the base plane 215. Referring first to FIG. 5A, a radar reflector 110 have four triangular panels 205 is illustrated, and the base panel 215 is substantially square-shaped. FIG. 5B illustrates a radar reflector 110 having six triangular panels 205, and the base panel of the illustrated radar reflector 110 is substantially hexagonal. In FIG. 5C, a radar reflector 110 comprising eight triangular panels 205 is illustrated, thereby forming an octagonal pyramidal frustum volume with a base plane 215 that is substantially octagonal.

Figure 6:
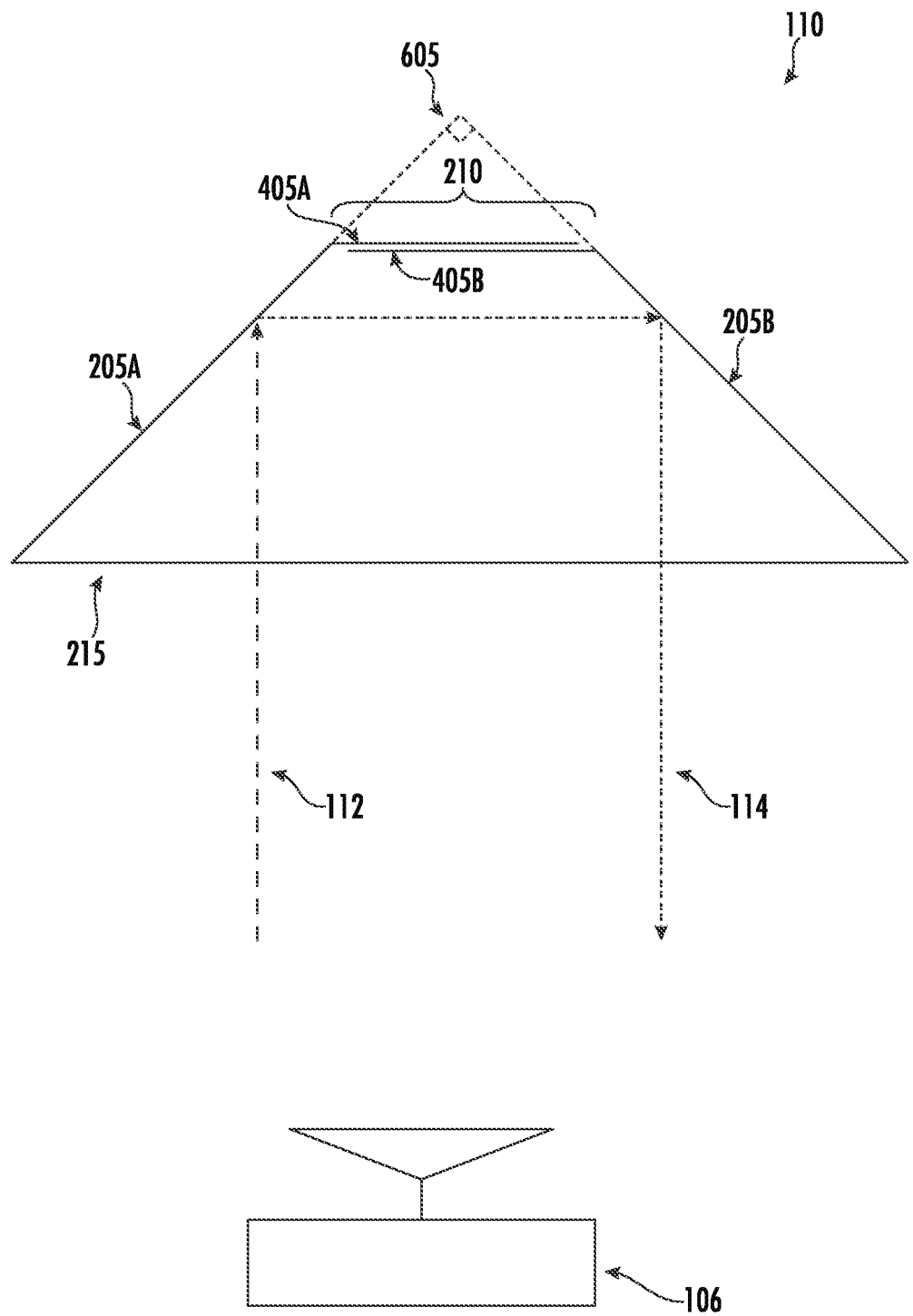
FIG. 6 illustrates a side view of an exemplary radar reflector, in accordance with various embodiments.

Each pair of triangular panels 205 of a radar reflector 110 having more than three triangular panels 205 (e.g., radar reflectors 110 illustrated in FIGS. 5A-C) is approximately perpendicular at a projected apex. FIG. 6 illustrates a side view of a pair of two triangular panels 205 of a radar reflector 110 having more than three triangular panels 205. As illustrated, the pair of two triangular panels 205 of the radar reflector 110 comprises a first triangular panel 205A and a second triangular panel 205B. Each triangular panel 205 comprises a respective upper vertex portion 405, and the upper vertex portions 405 are configured (e.g., bent) at an angle to form the upper plane 210 of the radar reflector. For example, as illustrated, the first upper vertex portion 405A of the first triangular panel 205A is planarly parallel and interfacing with the second upper vertex portion 405B of the second triangular panel 205B.

As discussed, a pair of triangular panels 205 is approximately perpendicular at a projected apex 605 or an extrapolated intersection. As illustrated, the projected apex 505 is a point at which the triangular panels 205 would pyramidally converge if not for the configuration of the upper vertex portions 405 to form a frustum volume with an upper plane 210. The projected apex 605 is then a point positioned above the upper plane 210 and is hypothetical, extended, extrapolated, and/or the like.

Due to the perpendicularity of the first triangular panel 205A and the second triangular panel 205B, the radar reflector 110 is configured to directly reflect radar signals. As illustrated in FIG. 6, original radar signals 112 may have a trajectory towards the radar reflector 110, and the original radar signals 112 may impact one of the first triangular panel 205A or the second triangular panel 205B. From this impact, the original radar signals 112 become reflected and are directed to impact with the other one of the first triangular panel 205A or the second triangular panel 205B. From impact with the other one of the first triangular panel 205A or the second triangular panel 205B, reflected radar signals 114 may have a trajectory away from the radar reflector 110 and at least substantially parallel (and opposite) with the trajectory of the original radar signals 112.

Thus, perpendicularity of the triangular panel pair enables direct reflection of radar signals in substantially parallel and opposite trajectories. Advantageously, in some examples, the radar reflector may be horizontally tilted to a certain extent (e.g., inadvertently due to imperfections or misalignments during installation) without significantly mis-directing the reflected radar signals 114 away from the radar transceiver 106. For example, in contrast with the illustrated embodiment, the original radar signals 112 may have a trajectory that is not exactly normal or perpendicular with the base plane 215 and the upper plane 210 of the radar reflector 110; however, the reflected radar signals 114 may have a trajectory with minimal deviation away from the radar transceiver 106. As such, approximately perpendicularity of the triangular panel pair in the radar reflector 110 enables improved detection of reflected radar signals 114 (e.g., increased signal strength) at the radar transceiver 106. In various embodiments, the angle between the triangular panel pair at the projected apex 605 is approximately 90 degrees, or approximately perpendicular. In some example embodiments, the angle between the triangular panel pair at the projected apex 605 is between approximately 65 degrees and approximately 115 degrees. In some example embodiments, the angle between the triangular panel pair at the projected apex 605 is between approximately 78 degrees and approximately 102 degrees. In some example embodiments, the angle between the triangular panel pair at the projected apex 605 is preferably between approximately 85 degrees and approximately 95 degrees.

Figure 7A:
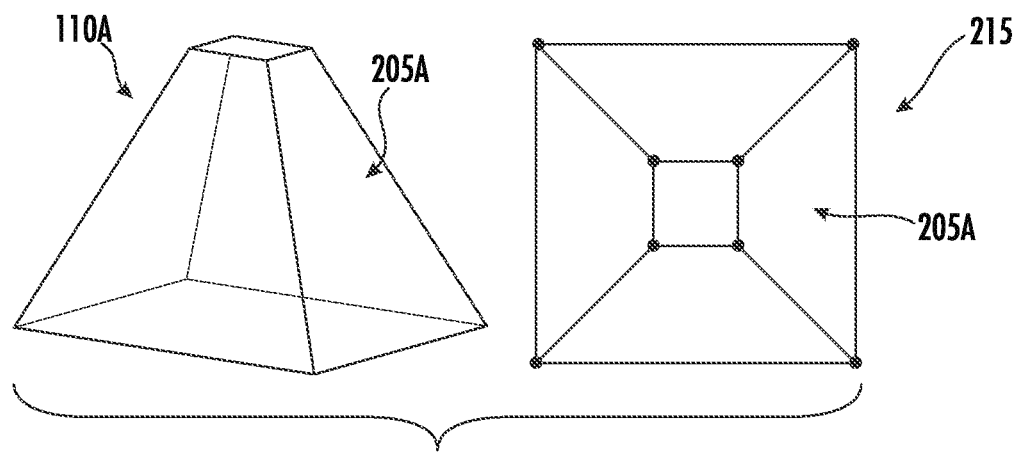
FIGS. 7A-B illustrate configuration of an exemplary radar reflector such that radar signals reflected by the exemplary radar reflector comprise a signature unique to the exemplary radar reflector in accordance with various embodiments described herein.
Figure 7B:
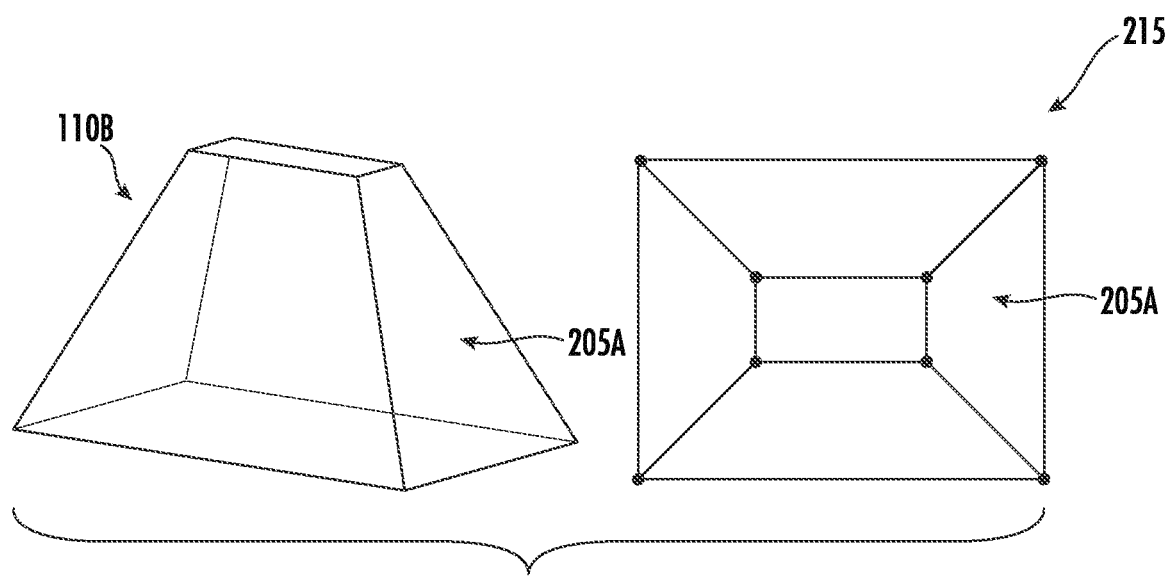

In various embodiments, a subset of the triangular panels 205 of a radar reflector 110 may be uniquely configured to cause the radar reflector 110 to reflect radio signals with a unique signature or pattern. Unique configuration of some triangular panels 205 causes unique geometry of the base plane 215. FIGS. 7A-B illustrate unique configuration of a triangular panel 205 of a radar reflector 110. In various embodiments, a triangular panel 205 is parallel shifted. Referring first to FIG. 7A, a radar reflector 110 having four triangular panels 205 and a square base plane geometry is illustrated. That is, as illustrated, the base plane 215 of the radar reflector 110 is approximately square. Reflected radar signals 114 reflected by the radar reflector 110 may have a particular signal strength, signal pattern, frequency spectrum pattern, frequency peak width, resonant frequencies, and/or the like.

The radar reflector 110 illustrated in FIG. 7A may be modified by parallel shifting a particular triangular panel 205A, as illustrated in FIG. 7B. Through parallel shift of the particular triangular panel 205A, the particular triangular panel 205A remains approximately perpendicular with an opposite paired triangular panel at a projected apex. Neighboring triangular panels 205 may be configured to have larger widths, wider upper vertex angles, and/or the like. As a result of the parallel shift of the particular triangular panel 205A, the base plane 215 is approximately rectangular, therefore having less rotational or radial symmetry. Thus, the base plane 215 may be considered to be asymmetric as a result of the unique configuration of a subset of the triangular panels 205 of the radar reflector. The parallel shift of the particular triangular panel 205A results in greater distance between the particular triangular panel 205A and its corresponding, opposite, or paired triangular panel 205. Thus, reflected radar signals 114 that are reflected by the modified radar reflector 110 (e.g., specifically reflected by the particular triangular panel 205A or its paired triangular panel 205) may have a different signal strength, signal pattern, frequency spectrum pattern, frequency peak width, resonant frequencies, and/or the like from reflected radar signals reflected by an unmodified radar reflector 110 (e.g., the radar reflector illustrated in FIG. 7A).

Thus, in various embodiments, the radar reflector 110 may be configured with a unique or asymmetric base plane geometry and arrangement of triangular panels 205 in order to provide reflected radar signals 114 with unique characteristics or a unique signature. As such, such a radar reflector 110 may uniquely improve detection of reflected radar signals 114 from the radar reflector 110 by aiding differentiation and distinguishment of the reflected radar signals 114 from other signal noise.

Figure 8:
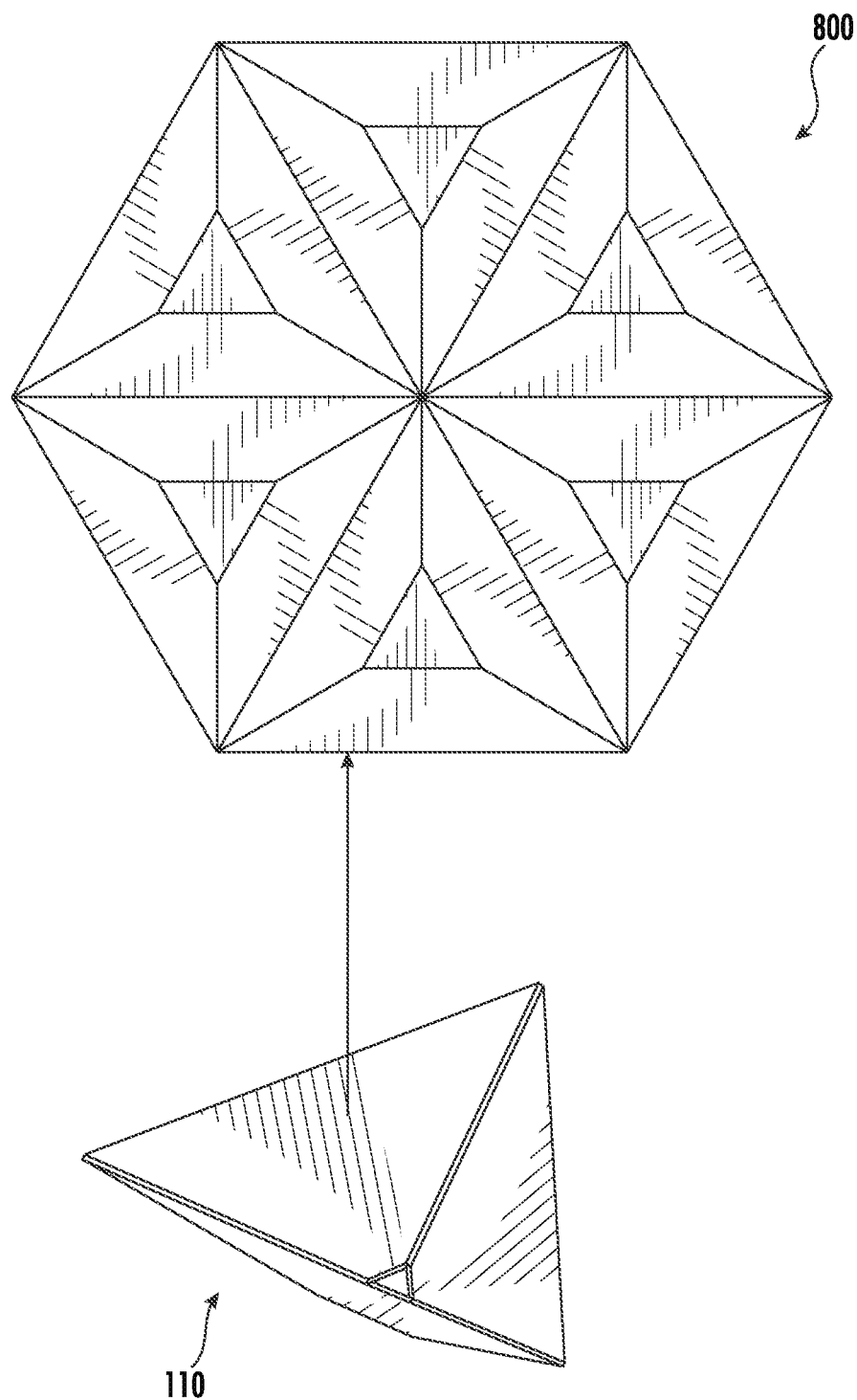
FIG. 8 illustrates an exemplary radar reflector array comprising a plurality of individual radar reflectors, in accordance with various embodiments.

FIG. 8 illustrates a radar reflector array 800 comprising multiple radar reflectors 110. In various embodiments, a radar reflector array 800 spans a wider horizontal area than one radar reflector 110, and the radar reflector array 800 may be installed within the internal shaft portion of the elevator shaft 101 to maximize reflection of radar signals emitted by the radar transceiver 106, or to maximize the amount of reflecting surface available to reflect radar signals emitted by the radar transceiver 106. In particular, the radar reflector array 800 advantageously increases the horizontal area for radar signal reflection while minimizing an overall height of the radar reflector array 800. Due to the confined space of the internal shaft portion of the elevator shaft 101, the advantageously minimized height of the radar reflector array 800 minimizes restrictions on the range of motion of the elevator car 105. Generally then, a first ratio of the horizontal area spanned by the radar reflector array 800 to the height of the radar reflector array 800 is significantly greater than a second ratio of the horizontal area spanned by one radar reflector 110 to the height of one radar reflector 110.

In various embodiments, the height of the radar reflector array 800 is substantially similar to the height of one radar reflector 110. For example, the radar reflectors 110 of the radar reflector array 800 are positioned in a planar arrangement, or positioned to be horizontally adjacent. In various embodiments, the radar reflectors 110 of the radar reflector array 800 are connected in the arrangement via the bottom edges 310 of the triangular panels 205. In the illustrated embodiment, six radar reflectors 110 each having three triangular panels 205 (e.g., therefore having triangular base plane geometry) are connected and arranged to form a hexagonal radar reflector array 800.

Figure 9:
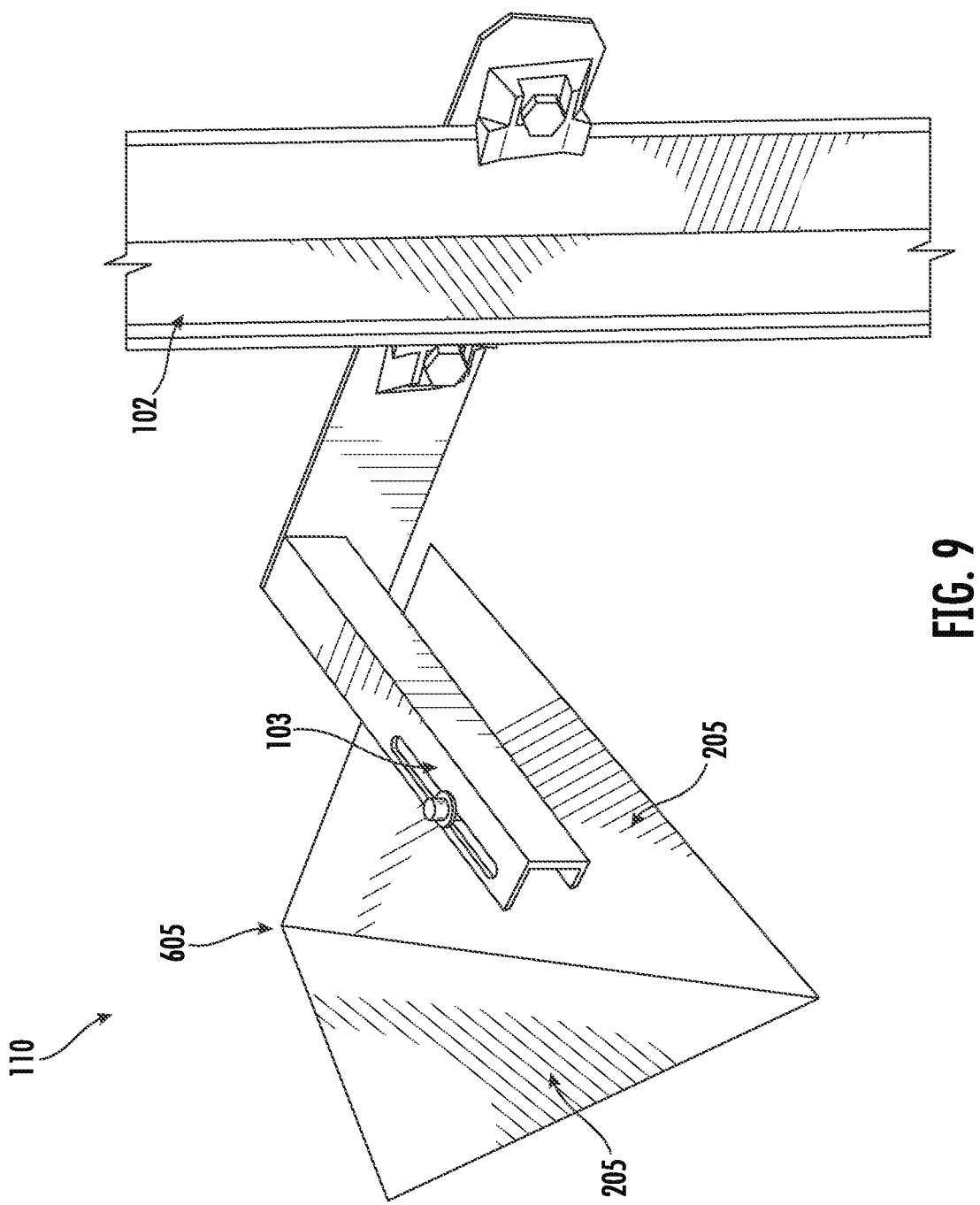
FIG. 9 illustrates a perspective view of an exemplary radar reflector in accordance with various embodiments.

FIG. 9 illustrates another non-limiting example radar reflector 110. Similar to previously described radar reflectors in accordance with various embodiments of the present disclosure, the illustrated radar reflector 110 of FIG. 9 comprises three triangular panels 205. In particular, the illustrated radar reflector 110 has a pyramidal volume formed from the three triangular panels 205 and having a base plane and an apex 605. That is, the illustrated radar reflector 110 of FIG. 9 may be an alternative embodiment to the previously described radar reflectors 110 having pyramidal frustum volumes with a base plane and an upper plane, and in the illustrated embodiment, the radar reflector 110 includes an apex 605 in lieu of an upper plane. Thus, in the illustrated embodiment, the triangular panels 205 of the radar reflector 110 are approximately mutually perpendicular at the apex 605 of the pyramidal volume (e.g., instead of at a projected or extrapolated apex of a pyramidal frustum volume).

Due to an absence of an upper plane in the radar reflector 110 of the illustrated embodiment, the radar reflector 110 may be fixedly attached to an attachment feature 103 of the elevator shaft 101 or the elevator car 105 through different or alternative means. In particular, the attachment feature 103 of the elevator shaft 101 may be attached at one end to a rail fixture 102 and may be attached at the other end to an exterior surface of at least one of the triangular panels 205, as illustrated in FIG. 9.

In some embodiments, multiple radar reflectors 110 having a pyramidal volume with a base plane and an apex, similar to the radar reflector 110 illustrated in FIG. 9, may be arranged horizontally to form a radar reflector array. For example, a radar reflector array such as the example radar reflector array 800 described in the context of FIG. 8 may be comprised of radar reflectors 110 of pyramidal volumes. In some embodiments, a radar reflector array may comprise one or more radar reflectors 110 having pyramidal frustum volumes and one or more radar reflectors 110 having pyramidal volumes. As aforementioned, a radar reflector array may be particular advantageous in minimizing height while maximizing a horizontal area at which radar signals may be reflected. In an example embodiment, a radar reflector array includes radar reflectors 110 having pyramidal volumes, and the radar reflector array is configured for attachment to an attachment feature of the elevator shaft 101 and/or the elevator car 105 via an exterior-facing surface of at least one of the radar reflectors 110 of the radar reflector array.

Generally, various embodiments of the present disclosure provide radar reflectors and arrays or arrangements thereof for improved direction of reflected radar signals, which then improves detection of reflected radar signals for more accurate radar-based distance measurements for an elevator positioning system. Radar reflectors described herein have pyramidal frustum volumes formed by triangular panels, an upper plane, and a base plane. Other example radar reflectors described herein may have pyramidal volumes formed by triangular panels and having a base plane and an apex. The triangular panels are configured to be approximately mutually perpendicular at an apex (e.g., a projected apex above an upper plane of a pyramidal frustum volume, an apex of a pyramidal volume) and/or along lateral edges, which cause reflected radar signals to advantageously have at least substantially parallel trajectories with their original (e.g., pre-reflectional) radar signals. With parallelism between the reflected radar signals and the original radar signals, the reflected radar signals are more precisely directed back to a radar transceiver. As a result, the reflected radar signals are detected with improved signal strength at the radar transceiver. Meanwhile, the pyramidal frustum volume of a radar reflector generally minimizes a height of the radar reflector, enabling compact positioning and installation within an elevator shaft.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A radar reflector comprising:
three or more triangular panels defining a pyramidal frustum volume having a base plane and an upper plane that are parallel, wherein the pyramidal frustum volume is configured to directly reflect radar signals originating from a radar transceiver back to the radar transceiver based at least in part on the triangular panels being approximately mutually perpendicular at a projected apex above the upper plane, wherein an upper vertex portion of each of the three or more triangular panels defines the upper plane and bottom edges of each of the three or more triangular panels defines the base plane, wherein each triangular side panel comprises lateral edges having protruding joint features, and wherein the three or more triangular panels are connected to each other via the protruding joint features.

2. The radar reflector of claim 1, wherein the upper vertex portion of each of the three or more triangular panels interfaces with each other to form the upper plane of the pyramidal frustum volume.

3. The radar reflector of claim 1, wherein each triangular panel is configured with an upper vertex angle determined based at least in part on a total number of triangular side panels for the radar reflector.

4. The radar reflector of claim 1, wherein the base plane of the pyramidal frustum volume is defined in a particular geometric shape configured to cause the radar signals reflected by the pyramidal frustum volume to have a particular signature associated with the particular geometric shape.

5. The radar reflector of claim 1, wherein the three or more triangular panels are manufactured from a single panel.

6. The radar reflector of claim 1, wherein the radar reflector and the radar transceiver are configured for determining radar-based distance measurements for an elevator positioning system configured to determine a position of an elevator car within an elevator shaft, and wherein the radar reflector is configured to interface with an attachment feature of the elevator shaft or an attachment feature of the elevator car via the upper plane of the pyramidal frustum volume.

7. A radar reflector array comprising:
a plurality of radar reflectors connected in a planar arrangement, each radar reflector comprising:
three or more triangular panels defining a pyramidal frustum volume having a base plane and an upper plane that are parallel, wherein the pyramidal frustum volume is configured to directly reflect radar signals originating from a radar transceiver back to the radar transceiver based at least in part on the triangular panels being approximately mutually perpendicular at a projected apex above the upper plane, wherein an upper vertex portion of each of the three or more triangular panels defines the upper plane and bottom edges of each of the three or more triangular panels defines the base plane;
wherein a first ratio of a total area spanned by the base planes of the plurality of radar reflectors to a height of the radar reflector array is greater than a second ratio of an area spanned by one base plane of one radar reflector to a height of the one radar reflector.

8. The radar reflector array of claim 7, wherein the upper vertex portion of each of the three or more triangular panels interfaces with each other to form the upper plane of the pyramidal frustum volume of the radar reflector.

9. The radar reflector array of claim 7, wherein the three or more triangular panels of at least one radar reflector are manufactured from a single panel.

10. The radar reflector array of claim 7, wherein the radar reflector array and the radar transceiver are configured for determining radar-based measurements for an elevator positioning system configured to determine a position of an elevator car within an elevator shaft.

11. An elevator positioning system for determining a position of an elevator car within an elevator shaft using radar-based distance measurements, the elevator positioning system comprising:
a radar reflector; and
a radar transceiver configured to emit a signal and receive at least a portion of the emitted signal reflected back from the radar reflector, wherein the radar reflector comprises:
three or more triangular panels defining a pyramidal volume having a base plane and an apex, wherein the pyramidal volume is configured to directly reflect radar signals originating from a radar transceiver back to the radar transceiver based at least in part on the triangular panels being approximately mutually perpendicular at the apex of the pyramidal volume, wherein bottom edges of each of the three or more triangular panels defines the base plane, wherein the radar reflector is configured to interface with an attachment feature of the elevator shaft or an attachment feature of the elevator car via an exterior-facing surface of at least one of the three or more triangular panels.

12. A radar reflector array for determining a position of an elevator car within an elevator shaft using radar-based distance measurements, the radar reflector array comprising:
a plurality of radar reflectors connected in a planar arrangement, each radar reflector comprising:
three or more triangular panels defining a pyramidal volume having a base plane and an apex, wherein the pyramidal volume is configured to directly reflect radar signals originating from a radar transceiver back to the radar transceiver based at least in part on the triangular panels being approximately mutually perpendicular at the apex of the pyramidal volume, wherein bottom edges of each of the three or more triangular panels defines the base plane;
wherein a first ratio of a total area spanned by the base planes of the plurality of radar reflectors to a height of the radar reflector array is greater than a second ratio of an area spanned by one base plane of one radar reflector to a height of the one radar reflector.

* * * * *